US009959974B2

(12) United States Patent
Baechle et al.

(10) Patent No.: US 9,959,974 B2
(45) Date of Patent: May 1, 2018

(54) METHOD FOR MAKING A STRUCTURAL CAPACITOR

(71) Applicant: U.S. Army Research Laboratory ATTN: RDRL-LOC-I, Adelphi, MD (US)

(72) Inventors: Daniel M. Baechle, Rosedale, MD (US); Daniel J. O'Brien, Hydes, MD (US); Eric D. Wetzel, Baltimore, MD (US); Oleg B. Yurchak, Montgomery Village, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 273 days.

(21) Appl. No.: 14/633,616

(22) Filed: Feb. 27, 2015

(65) Prior Publication Data
US 2016/0254093 A1 Sep. 1, 2016

(51) Int. Cl.
*H01G 7/00* (2006.01)
*H01G 4/30* (2006.01)
(Continued)

(52) U.S. Cl.
CPC ............... *H01G 4/30* (2013.01); *H01G 4/16* (2013.01); *H01G 4/18* (2013.01); *H01G 4/203* (2013.01); *H01G 4/232* (2013.01)

(58) Field of Classification Search
CPC ............ H01G 4/16; H01G 4/18; H01G 4/203; H01G 4/232; H01G 4/30
See application file for complete search history.

(56) References Cited

U.S. PATENT DOCUMENTS 4,001,656 A   1/1977   Voyles
4,535,382 A   8/1985   Wada et al.
(Continued)

FOREIGN PATENT DOCUMENTS

JP   04160705   6/1992

OTHER PUBLICATIONS

Scott et al., "Multifunctional power-generating and energy-storing structural composites for US Army applications", Nov. 29-Dec. 3, 2004 (conference dates), NN 4.6.1-NN 4.6.7.
(Continued)

*Primary Examiner* — Minh Trinh
(74) *Attorney, Agent, or Firm* — Christos S. Kyriakou

(57) ABSTRACT

A structural capacitor having a plurality of planar dielectric layers and a plurality of positive and negative electrodes with the positive and negative electrodes alternating between each dielectric layer and methods for making structural capacitors are provided. First and second spaced apart holes are provided through each dielectric layer as well as the electrodes so that the first holes in the electrodes register with the first holes in the dielectric layer and likewise for the second holes. The capacitor is formed by stacking the dielectric layers and electrodes on two spaced apart alignment pins with a positive alignment pin extending through the first holes and a negative alignment pin extending through the second holes in the dielectric layers and electrodes. These alignment pins maintain layer alignment during subsequent thermal and pressure processing to bond together the dielectric and electrode layers into an integral structural material. After processing, the alignment pins are removed and replaced with electrode pins, where the positive electrode pin is in electrical contact only with the positive electrodes and the negative electrode pin is in electrical contact only with the negative electrodes. The
(Continued)

electrode pins are used for subsequent electrical and mechanical connectorization to the structural capacitor.

9 Claims, 7 Drawing Sheets

(51) Int. Cl.
    *H01G 4/16*     (2006.01)
    *H01G 4/18*     (2006.01)
    *H01G 4/232*     (2006.01)
    *H01G 4/20*     (2006.01)

(56) References Cited

U.S. PATENT DOCUMENTS

| | | | |
|---|---|---|---|
| 5,121,301 A | 6/1992 | Kurabayashi et al. | |
| 5,168,421 A | 12/1992 | Suzuki et al. | |
| 5,187,548 A * | 2/1993 | Baek | H01L 27/10817 257/308 |
| 5,359,315 A * | 10/1994 | Inoue | H01F 21/00 333/168 |
| 5,793,603 A | 8/1998 | Lyman | |
| 5,898,561 A | 4/1999 | Mandelcorn et al. | |
| 6,092,269 A | 7/2000 | Yializis et al. | |
| 6,404,615 B1 | 6/2002 | Wijeyesekera et al. | |
| 6,981,671 B1 | 1/2006 | Baron et al. | |
| 7,057,881 B2 | 6/2006 | Chow et al. | |
| 7,486,498 B2 | 2/2009 | Welsch et al. | |
| 7,864,505 B1 | 1/2011 | O'Brien et al. | |
| 8,498,095 B2 * | 7/2013 | Yano | H01G 4/005 361/303 |
| 2003/0169558 A1 | 9/2003 | Olson et al. | |
| 2005/0168919 A1 | 8/2005 | Welsch et al. | |
| 2006/0171100 A1 | 8/2006 | Uematsu et al. | |
| 2007/0027246 A1 | 2/2007 | Shin et al. | |
| 2008/0225463 A1 * | 9/2008 | Takashima | H01G 4/232 361/306.3 |
| 2010/0321858 A1 * | 12/2010 | Hsu | H01G 4/1209 361/301.4 |
| 2012/0033342 A1 * | 2/2012 | Ito | H01G 4/224 361/301.4 |
| 2012/0241906 A1 * | 9/2012 | Nakanishi | H01L 23/49827 257/532 |
| 2015/0103465 A1 * | 4/2015 | Kang | H01G 4/1227 361/301.4 |
| 2015/0380167 A1 * | 12/2015 | Lim | H01G 4/30 361/301.4 |
| 2016/0254093 A1 * | 9/2016 | Baechle | H01G 4/30 361/301.4 |

OTHER PUBLICATIONS

Luo, et al. "Carbon-fiber/polymer-matrix composites as capacitors" Comp. Sci. Tech., 61, 885-888 (2001).

Carlson T, Ordeus D, Wysocki M, Asp LE. Structural capacitor materials made from carbon fibre epoxy composites. Composites Science and Technology. 2010,70(7)1135-40.

O'Brien, D. J., et al. "Effect of processing conditions and electrode characteristics on the electrical properties of structural composite capacitors." Composites Part A: Applied Science and Manufacturing 68 (2015): 47-55.

Lin Y, Zhou Z, Sodano HA. Barium titanate and barium strontium titanate coated carbon fibers for multifunctional structural capacitors. J Compos Mater. 2013;47(12)1527-33.

Lestoquoy G, Chocat N, Wang Z, Joannopoulos JD, Fink Y. Fabrication and characterization of thermally drawn fiber capacitors. Applied Physics Letters. 2013;102:152908.

Luo X, Chung D. Carbon-fiber/polymer-matrix composites as capacitors. Composites Science and Technology. 2001;61(6):885-8.

Javaid A, Ho K, Bismarck A, Shaffer M, Steinke J, Greenhalgh E. Multifunctional structural supercapacitors for electrical energy storage applications. J Compos Mater. 2013.

O'Brien DJ, Baechle DM, Wetzel ED, Asme. Performance metrics for structural composite capacitors. New York: Amer Soc Mechanical Engineers; 2010.

D. J. O'Brien, D. M. Baechle, and E. D. Wetzel. "Design and performance of multifunctional structural composite capacitors." J. Composite Materials. v45 n26 p. 2797-2809. 2011.

* cited by examiner

METHOD FOR MAKING A STRUCTURAL CAPACITOR

GOVERNMENT INTEREST

The invention described herein may be manufactured, used, and licensed by or for the United States Government.

BACKGROUND OF THE INVENTION

1. Field of the Invention

The present invention relates generally to capacitors and, more particularly, to a structural capacitor.

2. Description of Related Art

In many situations it is desirable to create electrical capacitors that can not only store electrical energy, but also simultaneously carry mechanical loads. For example, in military applications, the storage and release of electrical pulsed power is useful in many different applications, such as electromagnetic rail guns, electromagnetic armor, short-pulse high-energy lasers, and the like. Cylindrically wound thin-film capacitors are one technology used to store and release electrical energy.

There have been conventional pulsed power platforms that include components which carry structural loads. For example, continuous fiber-reinforced, polymer-matrix composite materials have been used to create strong, stiff, and lightweight structures, such as vehicle frames and ballistic armor panels.

Gains in overall platform efficiency are possible by creating a laminated composite material that can both carry mechanical loads as well as store and release electrical energy. The previously known designs include metallized polymer film electrodes that are interleaved between glass fiber-reinforced epoxy composite plies with the resulting stack of materials processed together to integrally bond the components together.

In order to form such laminated structural capacitors, the previously known methods include enveloping the materials in an evacuated bag so that the stack of laminated materials is subjected to atmospheric pressure. The bag with the contained stack is then placed in an autoclave, hot press, or convection oven to bond the layers together.

These previously known methods, however, have only been effective to form structural laminated capacitors for a limited number of layers, e.g. no more than about five dielectric layers, since the layers are not laterally confined while being constructed or bonded together. Rather, under the compaction pressure, the layers of material move laterally and lose their relative alignment with each other.

Alignment, however, is the key to both structural and electrical operation since the alignment and relative position of the layers determines both the laminate stiffness and strength as well as the energy density and capacitance of the capacitor. In some cases, the lateral shifting of the layers may result in misalignment of electrodes so that opposing electrodes are in direct contact with each other. This, in turn, shorts the capacitor rendering it inoperable.

Other methods, such as closed molds and adhesive tape, have also been tried to limit lateral movement of the layers when constructing and bonding the layers of the structural capacitor together. These previously known attempts, however, have not proven successful except for only a limited number of layers of the capacitor. The limited number of capacitor layers, in turn, limits not only the structural strength of the capacitor, but also the capacitance and amount of energy which can be stored by the capacitor.

SUMMARY OF THE PRESENT INVENTION

The present invention provides a structural capacitor and method for making the structural capacitor which overcomes the above mentioned disadvantages of the previously known devices and methods.

In brief, the structural capacitor of the present invention includes a plurality of planar structural dielectric layers. Each layer has at least a first and a second spaced apart alignment hole which extends from a top and to a bottom of each layer.

A plurality of planar positive electrodes and a plurality of planar negative electrodes are then provided. Each electrode, furthermore, includes at least a first and second spaced apart alignment hole extending from a top and to a bottom of each electrode. The positive electrodes have an electrically conductive portion in electrical contact with the first hole but not the second hole while the negative electrodes have an electrically conductive portion in electrical contact with the second hole, but not the first hole. In one embodiment, the electrodes consist of a thin metallization layer on the surface of a paper support layer. In another embodiment, the electrodes consist of a thin metallization layer on the surface of a polymer film.

In order to construct the structural capacitor, a positive alignment pin and a negative alignment pin are arranged in a spaced apart and parallel relationship so that the first alignment pin registers with the first holes in the dielectric layers and the electrodes while the negative alignment pin registers with the second holes in the dielectric layers and electrodes. The alignment pins maintain the alignment of the dielectric layers and electrodes relative to each other and enable the stacking of multiple layers for the capacitor while maintaining the alignment of the layers and electrodes relative to each other.

After the desired number of dielectric layers and electrodes are stacked upon the alignment pins, the layers are sandwiched between a top plate and a bottom plate using conventional fasteners which engage the alignment pins. The resulting structure is then bonded together in any conventional fashion, such as a convection oven, hot press, and the like.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE INVENTION

Figure 1:
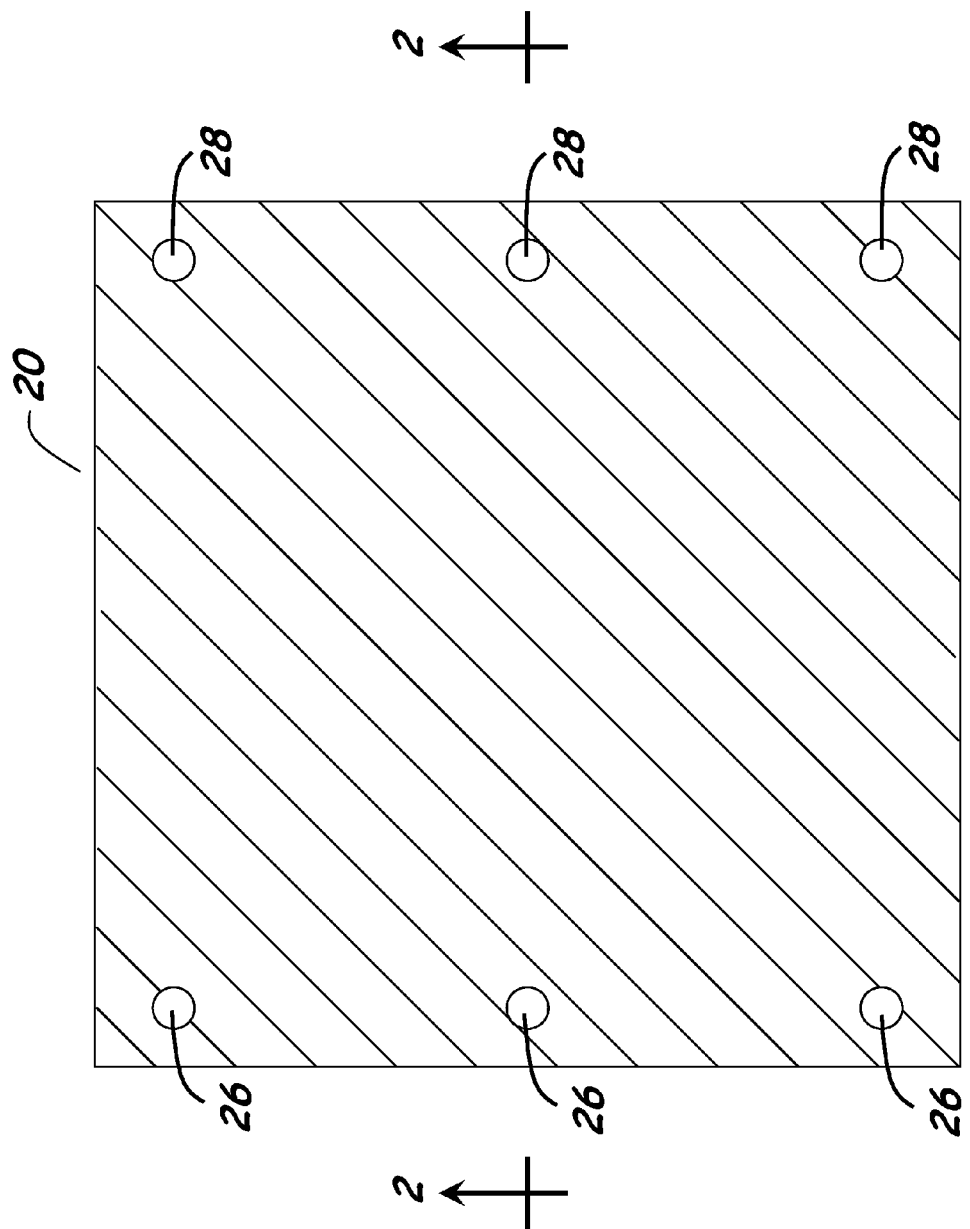
FIG. 1 is a top plan view illustrating a preferred embodiment of the present invention.
Figure 2:
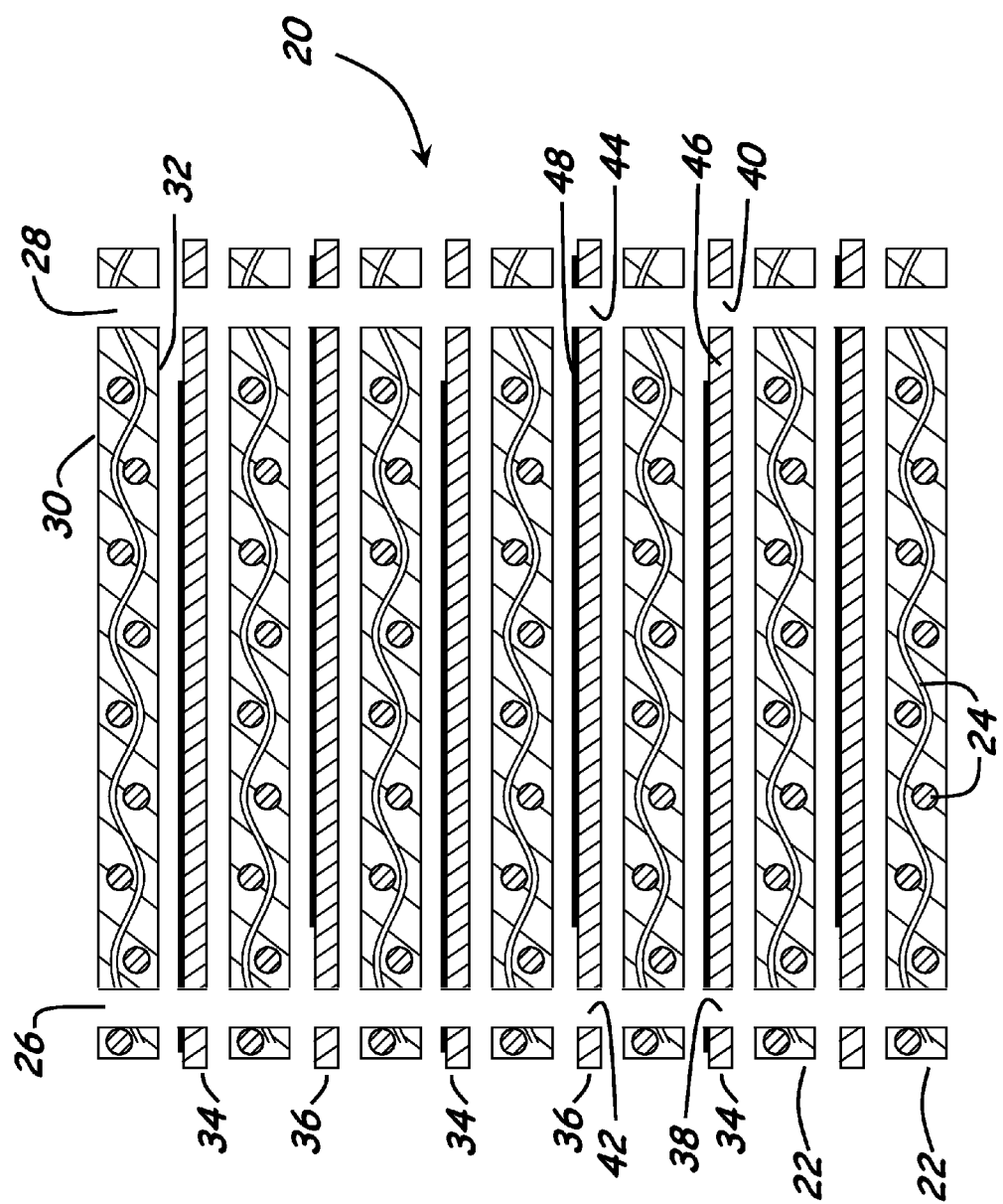
FIG. 2 is an exploded sectional view taken substantially along line 2-2 in FIG. 1 and enlarged for clarity.

With reference first to FIGS. 1 and 2, an exemplary structural capacitor 20 in accordance with the present invention is illustrated. The structural capacitor 20 is illustrated in FIG. 1 as being generally rectangular or square in shape. However, the structural capacitor 20 may be formed in any shape desired without deviation from the spirit or scope of the invention.

Still referring to FIGS. 1 and 2, the structural capacitor includes a plurality of dielectric layers 22. These dielectric layers 22 are preferably formed from a polymer, such as an epoxy polymer. In order to enhance the structural strength of the dielectric layers 22, the dielectric layers 22 are preferably reinforced with fibers 24 such as glass fibers. The fibers 24 are preferably formed in an interwoven mesh as shown in FIG. 2.

A first alignment hole 26 and a spaced apart second alignment hole 28 are provided between a top surface 30 and a bottom surface 32 of each dielectric layer. These alignment holes 26 and 28, furthermore, are at the same position for each of the dielectric layers 22.

Referring now particularly to FIG. 2, the capacitor 20 comprises a plurality of positive electrodes 34 as well as a plurality of negative electrodes 36. The positive electrodes 34 each have a pair of spaced apart alignment holes 38 and 40, respectively, while, similarly, the negative electrodes 36 have a first and second alignment hole 42 and 44, respectively. The first alignment holes 38 and 42 in the positive and negative electrodes 34 and 36, respectively, are aligned with the first alignment holes 26 in the dielectric layers 30. Similarly, the second alignment holes 40 and 44 in the positive and negative electrodes 34 and 36, respectively, are aligned with the second alignment holes 28 in the dielectric layers 22.

Although the electrodes may take many forms, in a preferred embodiment, each electrode 34 and 36 includes a paper separator 46 having a conductive film 48 formed on at least a portion of one side of the paper separator 46.

Still referring to FIG. 2, the conductive film 48 on the positive electrodes 34 extends around and is in contact with the first alignment holes 38 in the positive electrode 34, but not the second alignment hole 40 in the positive electrode 34. Conversely, the conductive film 48 on the negative electrode 36 extends around and is in contact with the second alignment hole 44, but not the first alignment hole 42.

Figure 3:
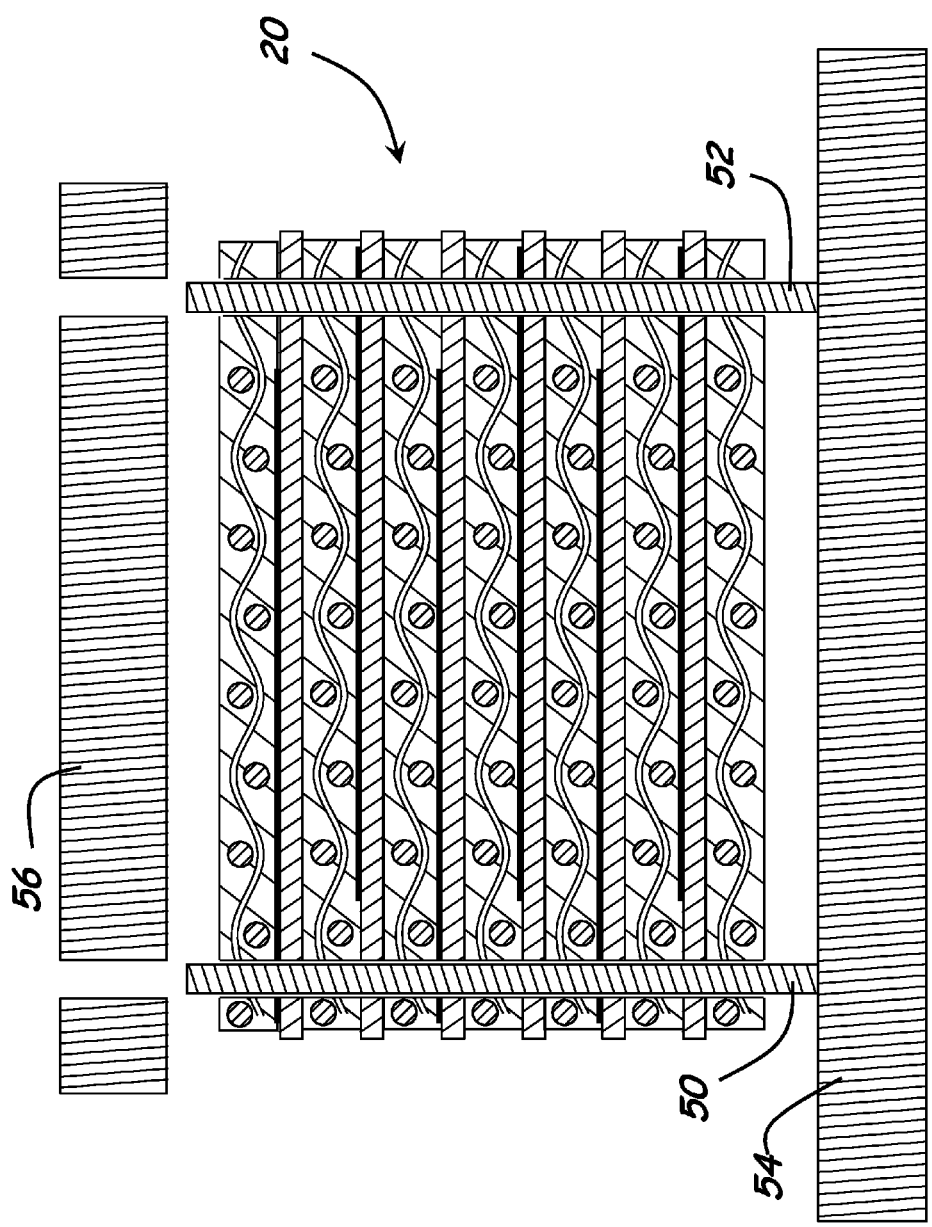
FIG. 3 is a cross-sectional view of the structural capacitor during its assembly.
Figure 4:
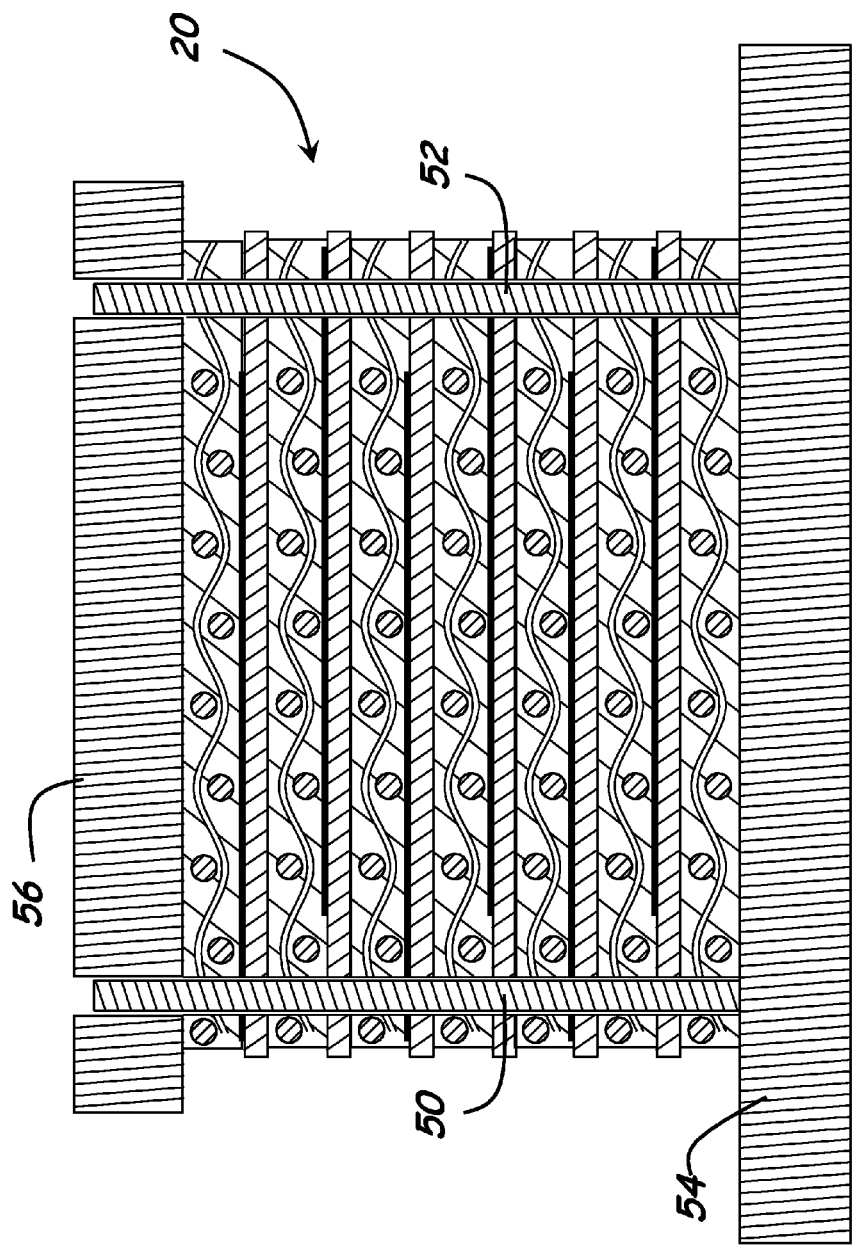
FIG. 4 is a view similar to FIG. 3, but illustrating the completion of the stacking of the structural capacitor components sandwiched between top and bottom compression plates.

With reference now to FIGS. 2 and 3, in order to construct the structural capacitor 20, a positive alignment pin 50 and a negative alignment pin 52 are mounted to a bottom compression plate 54 so that the alignment pins 50 and 52 are spaced apart and parallel to each other. The dielectric layers 22 and alternating positive 34 and negative electrodes 36 are then sequentially stacked upon the alignment pins 50 and 52 with the alignment pin 52 extending through the first holes in the dielectric layers 22 and electrodes 34 and 36, and the negative alignment pin 52 extending through the second holes in the dielectric layers 22 and positive and negative electrodes 34 and 36. After a plurality of dielectric layers 22 and electrodes 34 and 36 have been stacked upon the alignment pins 50 and 52, a top compression plate 56 is positioned over the upper ends of the alignment pins 50 and 52 thus sandwiching the layers and electrodes together as shown in FIG. 4.

Figure 5:
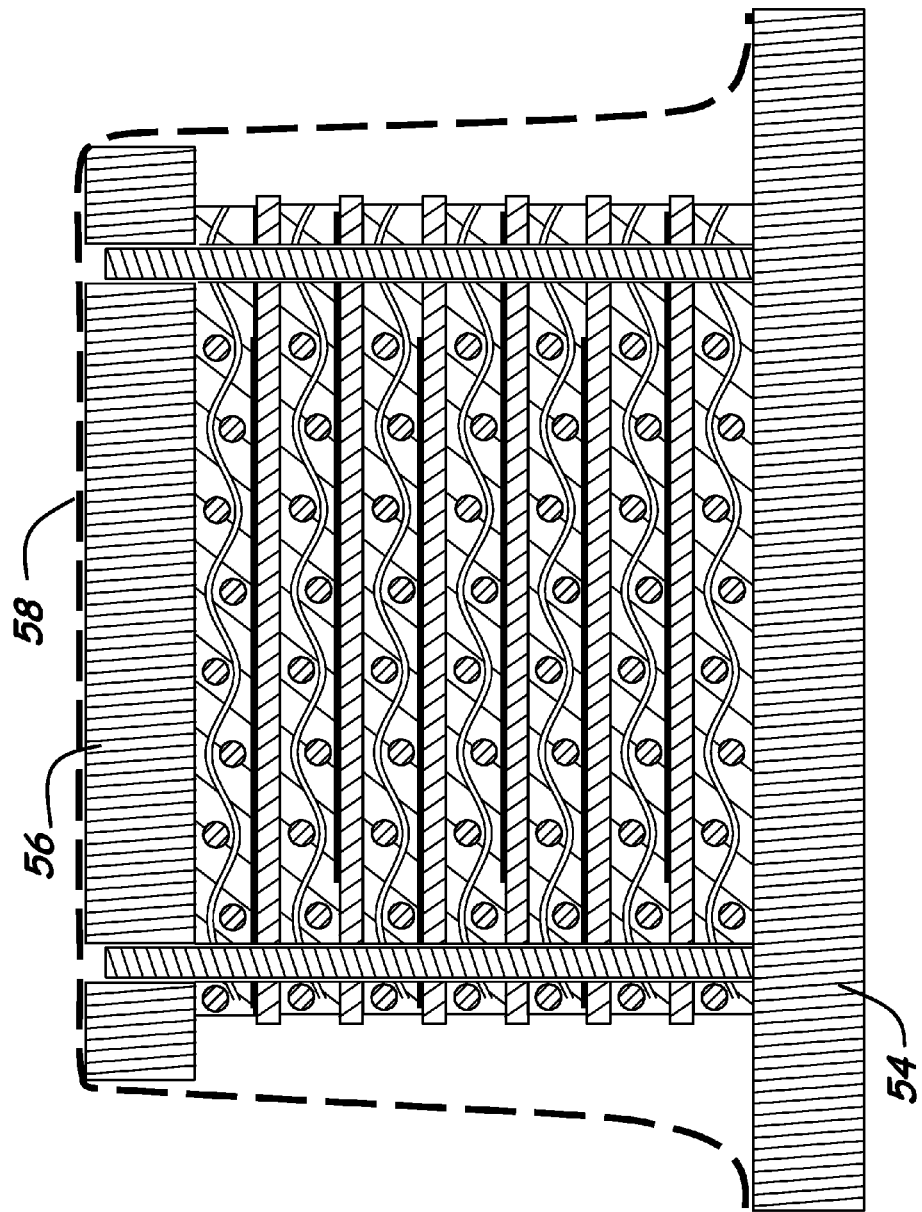
FIG. 5 is a view similar to FIG. 4, but illustrating the structural capacitor components enveloped in a vacuum bag.

With reference now to FIG. 5, in order to bond the dielectric layers 22 and electrodes 34 and 36 together, a vacuum bag 58 preferably envelopes the dielectric capacitor 20 as well as the bottom plate 54 and top plate 56. The vacuum bag 58 containing the dielectric capacitor is then placed in a convection oven, hot press, or the like in order to bond the dielectric layers 22 and electrodes 34 and 36 together.

Figure 6:
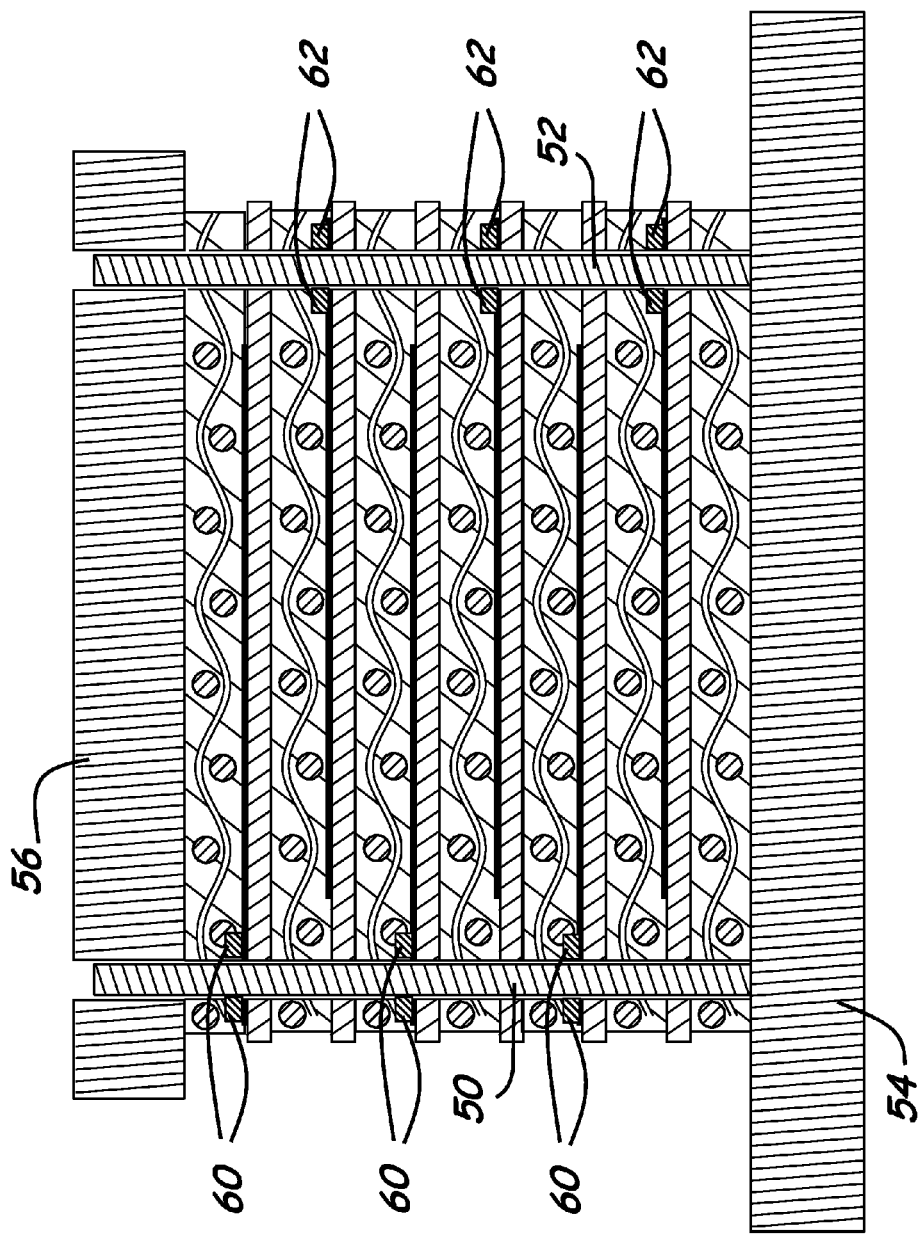
FIG. 6 is a view similar to FIG. 4, but illustrating a modification thereof.

With reference now to FIG. 6, in order to ensure a sound electrical contact between the alignment pins 50 and 52 and their associated electrodes 34 and 36, an elongated bus strip 60 extends around the first alignment pin 50 and is in electrical contact with the positive electrodes. Similarly, a negative bus strip 62 is provided around the second alignment pin 52 and is in electrical contact with the negative electrodes.

Figure 7:
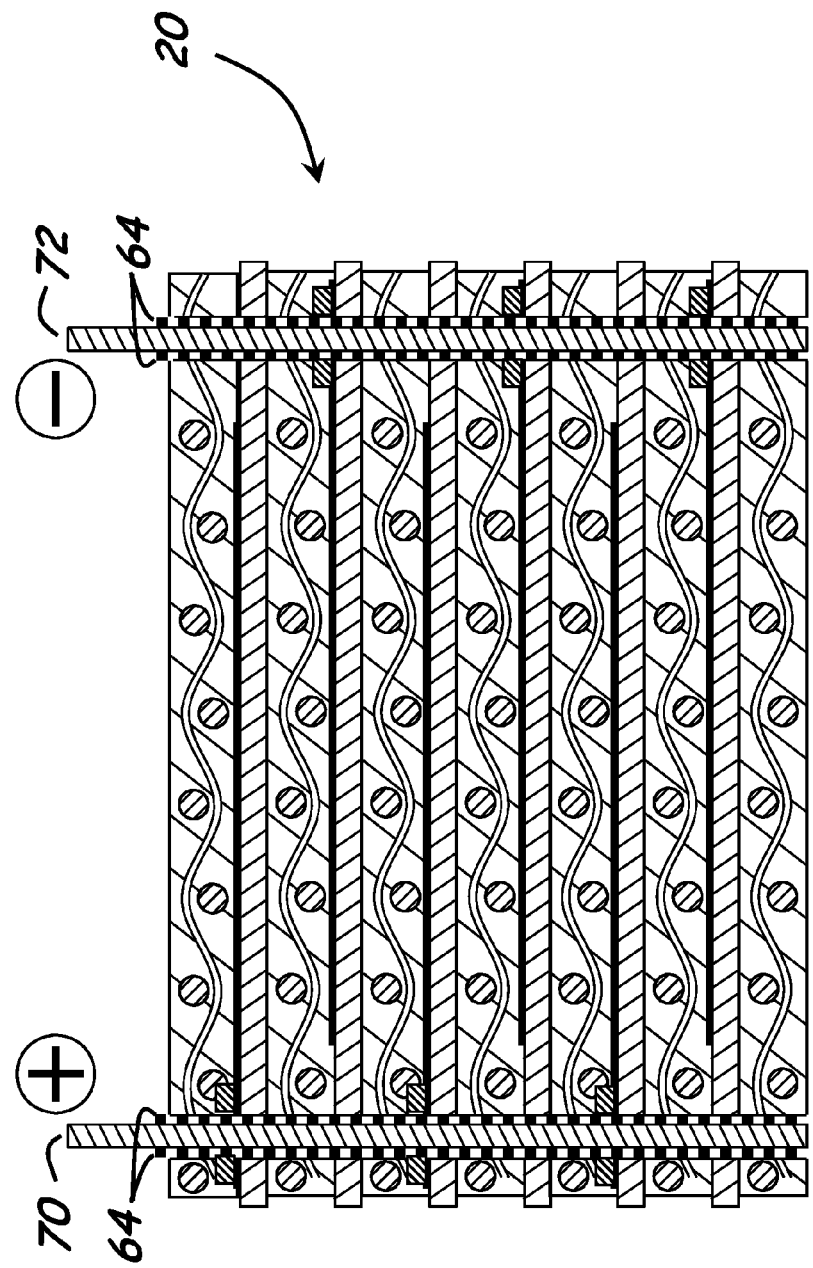
FIG. 7 shows the final structural capacitor after removal from the compression plates and vacuum bag, and insertion of electrical pins.

With reference now to FIG. 7, to complete the structural capacitor, the bonded dielectric and electrode layers are removed from the compression plates and alignment pins and through the alignment holes are placed a positive electrode pin 70 and negative electrode pin 72. A conductive fill material 64 may be inserted around the first electrode pin 70 to enhance the electrical contact between the first electrode pin 70 and the positive electrodes. Similarly, fill material 64 is inserted around the second electrode pin 72 to enhance the electrical contact between the second electrode pin 72 and the negative electrodes. The fill material 64 may comprise metal solder, metal-laden polymer such as a conductive epoxy, a conductive paint such as silver paint, and/or the like.

As shown in FIG. 7, the electrode pins 70 and 72 protrude outwardly from one side, e.g. the top, of the structural capacitor 20. These electrode pins 70 and 72 may be externally threaded for convenient connection to electrical cables. Alternatively, the threaded electrode pins 70 and 72 may be used in conjunction with mechanical fasteners, such as nuts, to mechanically integrate the structural capacitor 20 with its associated device.

From the foregoing, it can be seen that the present invention provides a simple yet effective structural capacitor which may contain many layers of dielectric material and electrodes without fear of misalignment of its layers. Having described our invention, however, many modifications thereto will become apparent to those skilled in the art to which it pertains without deviation from the spirit of the invention as defined by the scope of the appended claims.

We claim:

1. A method of constructing a structural capacitor comprising the steps of:
    forming a plurality of dielectric layers, each layer having a first and a second spaced apart alignment holes extending between a top and a bottom of each dielectric layer,
    forming a plurality of planar electrically conductive positive and negative electrodes, each electrode having a first and a second spaced apart alignment holes extending between a top and a bottom of each electrode, said positive electrodes having an electrically conductive portion in electrical contact with said first hole but not said second hole and said negative electrodes having an electrically conductive portion in electrical contact with said second hole but not said first hole,
    arranging a positive alignment pin and a negative alignment pin in a spaced apart and parallel relationship, creating a stack having a plurality of dielectric layers and alternating positive and negative electrodes stacked upon each other so that said positive alignment pin extends through said first holes in said dielectric layers and electrodes and so that said negative alignment pin extends through said second holes in said dielectric layers and electrodes, and removing the structural capacitor from the top plate, bottom plate, and alignment pins, and then placing electrically conductive electrode pins into said first and second alignment holes alignment holes.

2. The method as defined in claim 1 and comprising the step of sandwiching said stack between a top plate and a bottom plate.

3. The method as defined in claim 1 wherein said dielectric layers each comprise a fiber reinforced polymer.

4. The method as defined in claim 3 wherein said polymer comprises an epoxy polymer.

5. The structural capacitor as defined in claim 3 wherein said fiber comprises an interwoven mesh.

6. The method as defined in claim 3 wherein said fiber comprises a glass fiber.

7. The method as defined in claim 1 further comprising the step of placing an electrically conductive fill material in said first and second alignment holes.

8. The method as defined in claim 7 wherein said fill material fills a space between said electrode pins and said stack.

9. A method of constructing a structural capacitor comprising the steps of:

forming a plurality of dielectric layers, each layer having a first and a second spaced apart alignment holes extending between a top and a bottom of each dielectric layer, forming a plurality of planar electrically conductive positive and negative electrodes, each electrode having a first and a second spaced apart alignment holes extending between a top and a bottom of each electrode, said positive electrodes having an electrically conductive portion in electrical contact with said first hole but not said second hole and said negative electrodes having an electrically conductive portion in electrical contact with said second hole but not said first hole, arranging a positive alignment pin and a negative alignment pin in a spaced apart and parallel relationship, creating a stack having a plurality of dielectric layers and alternating positive and negative electrodes stacked upon each other so that said positive alignment pin extends through said first holes in said dielectric layers and electrodes and so that said negative alignment pin extends through said second holes in said dielectric layers and electrodes, and removing the structural capacitor from the top plate, bottom plate, and alignment pins, and then placing electrically conductive electrode pins into said first and second alignment holes alignment holes.

\* \* \* \* \*